US009446717B2

(12) United States Patent
Gray

(10) Patent No.: US 9,446,717 B2
(45) Date of Patent: *Sep. 20, 2016

(54) MULTI-PURPOSE RACK AND METHOD THEREOF

(71) Applicant: Larry Alan Gray, Lake George, NY (US)

(72) Inventor: Larry Alan Gray, Lake George, NY (US)

(*) Notice: Subject to any disclaimer, the term of this patent is extended or adjusted under 35 U.S.C. 154(b) by 22 days.

This patent is subject to a terminal disclaimer.

(21) Appl. No.: 14/456,803

(22) Filed: Aug. 11, 2014

(65) Prior Publication Data

US 2014/0346208 A1 Nov. 27, 2014

Related U.S. Application Data

(63) Continuation of application No. 13/421,283, filed on Mar. 15, 2012, now Pat. No. 8,800,831, which is a continuation-in-part of application No. 12/543,646, filed on Aug. 19, 2009, now Pat. No. 8,590,758.

(60) Provisional application No. 61/089,960, filed on Aug. 19, 2008.

(51) Int. Cl.
| | |
|---|---|
| *B60R 9/06* | (2006.01) |
| *B60R 9/08* | (2006.01) |
| *B60R 9/12* | (2006.01) |
| *B60R 9/10* | (2006.01) |
| *B60P 3/10* | (2006.01) |

(52) U.S. Cl.
CPC . *B60R 9/10* (2013.01); *B60P 3/10* (2013.01); *B60P 3/1033* (2013.01); *B60P 3/1075* (2013.01); *B60R 9/06* (2013.01); *B60R 9/08* (2013.01); *B60R 9/12* (2013.01); *Y10T 29/49826* (2015.01)

(58) Field of Classification Search
CPC .............. B60R 9/06; B60R 9/08; B60R 9/12
USPC ....... 224/488, 501, 510, 519, 520, 521, 523, 224/524, 525, 526, 529, 530, 531, 532, 537, 224/924
See application file for complete search history.

(56) References Cited

U.S. PATENT DOCUMENTS

| | | | |
|---|---|---|---|
| 3,504,831 A | 4/1970 | Highnote | |
| 3,610,431 A | 10/1971 | Rodden | |
| 3,854,641 A | 12/1974 | Kohls | |
| 4,277,008 A | 7/1981 | McCleary | |

(Continued)

OTHER PUBLICATIONS

The Adjustable RV, SUV, Camper Rack System for bikes, kayaks, coolers, grills and more . . . , http://www.rvraxx.com/index.html (last visited Aug. 19, 2009).

*Primary Examiner* — Gary Elkins
(74) *Attorney, Agent, or Firm* — Schmeiser, Olsen & Watts, LLP

(57) ABSTRACT

A multipurpose rack comprising a first racking assembly including a first securing portion configured to secure a first portion of a first transportation device, and a second securing portion operably connected to the first securing portion configured to releasably secure a second portion of the first transportation device, a second racking assembly including a first end portion having a clamping assembly, wherein the first end portion includes a lower support frame, a second end portion operably connected to the first end portion and spaced apart from the first end portion, the second end portion removably enclosing another portion of the second transportation is provided. An associated method is also provided.

15 Claims, 18 Drawing Sheets

(56) References Cited

U.S. PATENT DOCUMENTS

| | | |
|---|---|---|
| 4,508,229 A | 4/1985 | Yost, Jr. |
| 5,330,312 A | 7/1994 | Allop et al. |
| 5,477,968 A | 12/1995 | Largent et al. |
| 6,006,973 A | 12/1999 | Belinky et al. |
| 6,039,227 A | 3/2000 | Stark |
| 6,039,228 A | 3/2000 | Stein et al. |
| 6,345,749 B1 | 2/2002 | Hamilton |
| 6,457,619 B1 | 10/2002 | Werner et al. |
| 6,460,745 B1 | 10/2002 | Weaver |
| 6,554,171 B1 | 4/2003 | Ewing, III |
| 8,590,758 B2 | 11/2013 | Gray |
| 8,800,831 B2 * | 8/2014 | Gray ................. B60P 3/10 224/501 |
| 2001/0035446 A1 | 11/2001 | Walstrom et al. |
| 2005/0092800 A1* | 5/2005 | Wilson ................ B60R 9/08 224/513 |
| 2005/0205630 A1* | 9/2005 | Cooper ............... B60R 9/12 224/521 |
| 2009/0261136 A1 | 10/2009 | Skoff |
| 2010/0213226 A1 | 8/2010 | Gray |
| 2010/0213228 A1* | 8/2010 | Dannewitz .......... B60R 9/06 224/401 |

* cited by examiner

MULTI-PURPOSE RACK AND METHOD THEREOF

RELATED APPLICATIONS

This application is a continuation of U.S. patent application Ser. No. 13/421,283, now U.S. Pat. No. 8,800,831, entitled "A Multi-Purpose Rack and Method Thereof, which is a continuation-in-part, claiming priority to U.S. Nonprovisional application Ser. No. 12/543,646 filed Aug. 19, 2009, now U.S. Pat. No. 8,590,758, entitled "A Watercraft Rack and Method of Racking the Same," with the United States Patent and Trademark Office, which claimed priority to U.S. Provisional No. 61/089,960, filed Aug. 19, 2008, entitled "Vertical Watercraft Rack."

BACKGROUND OF THE INVENTION

1. Field of the Invention

The present invention relates to an apparatus and method for racking one or more watercraft and one or more bicycles, mopeds, motorcycles, or other lightweight land vehicles, on a vehicle, and in particular, a Recreational Vehicle and the like.

2. Related Art

Kayaking, canoeing, boating and related watercraft activities have become a very popular recreational activity, sport, and hobby, especially for travelers, adventurers, and families. To fully enjoy and properly use a kayak, or any watercraft, the watercraft needs to be operated on a navigable waterway, such as inter alia, a river, lake, stream, ocean, pond, or any body of water. Often times, people have to travel to these waterways to fully enjoy and properly use a kayak, or any watercraft. Popular methods of travel include, inter alia, Recreational Vehicles ("RV"), campers, and trailers. Traveling, especially for long distances, with vehicles of such size and width of an RV impose a burden on travelers, adventurers, and families who wish to bring a kayak, or any watercraft, along with them while traveling because of the difficulties and constraints associated with properly and securely affixing the watercraft to a vehicle, in particular, a vehicle with larger dimensions.

Moreover, it is likely that a traveler would also like to bring one or more bicycles mopeds, motorcycles, or other lightweight land vehicles. Storing the bicycles inside a RV would take up precious living space within the RV, and transporting bicycles, mopeds, motorcycles, or other lightweight land vehicles, on an RV can be difficult for the same reasons as listed above with respect to kayaks.

Thus, there is a need for an apparatus and method which overcomes the aforementioned deficiencies in the art for racking a watercraft, such as a kayak, along with a bicycle, mopeds, motorcycles, or other lightweight land vehicles, on a vehicle, and in particular, a larger vehicle, such as, inter alia, a RV.

SUMMARY OF THE INVENTION

A first aspect of the present invention provides a watercraft rack comprising: a first end configured to engage a trailer hitch receiver, wherein said first end accommodates a portion of a watercraft; a second end spaced apart from said first end, said second end removably enclosing another portion of said watercraft; and a connecting member connecting said first end with said second end.

A second aspect of the present invention provides a watercraft rack comprising: a lower support unit having a bracing system and a lower support member, said lower support member configured to support a first end of a watercraft; a lower support frame connected to said lower support member; an upper support frame having at least two side members and a locking member to form an enclosure about the second end of the watercraft; and a vertical frame having a bottom end secured to said lower support unit, and a top end secured to said upper support frame.

A third aspect of the present invention provides a method for racking a watercraft comprising: providing a watercraft rack, said watercraft rack including a first end having a lower support frame, a connecting member connecting said first end to a spaced apart second end, said second end having an upper support frame; removably engaging said first end of said watercraft rack with a standard trailer hitch receiver; accommodating a portion of a watercraft with said first end; and removably enclosing another portion of said watercraft within said second end.

A fourth aspect relates generally to a multipurpose rack comprising a first securing portion configured to secure a first portion of a transportation device, and a second securing portion configured to secure a second portion of the transportation device, wherein the first securing portion is operably secured to a lower support unit, the lower support unit configured to engage a vehicle element.

A fifth aspect relates generally to a multi-purpose rack comprising a lower support unit configured to engage a vehicle, a lower support frame operably connected to the lower support unit, the lower support frame configured to accommodate a first portion of a watercraft, an upper support frame having at least two side members and a locking member to form an enclosure about a second portion of the watercraft, a track element operably connected to the lower support frame, the track element configured to accommodate a first portion of a transportation device, and a securing element proximate the upper support frame, the securing element configured to engage a second portion of the transportation device.

A sixth aspect relates generally to a method of racking a watercraft and a transportation device comprising providing a rack including a watercraft racking portion and a transportation device racking portion, and engaging a vehicle element with a lower support unit of the rack.

BRIEF DESCRIPTION OF THE DRAWINGS

Some of the embodiments of this invention will be described in detail, with reference to the following figures, wherein like designations denote like members wherein.

DETAILED DESCRIPTION OF THE DRAWINGS

Figure 1:
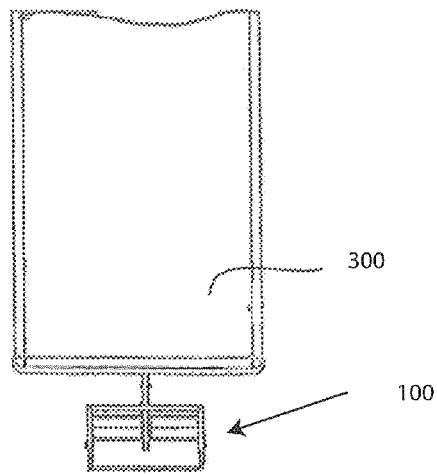
FIG. 1 depicts a top view of an embodiment of a vehicle with a watercraft rack.
Figure 2:
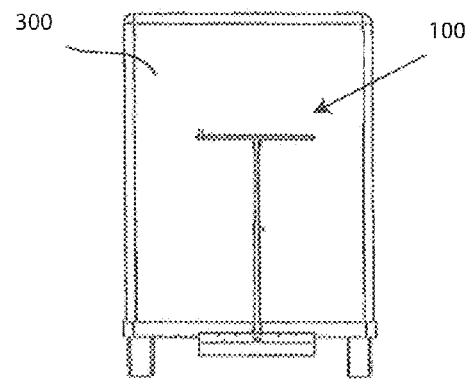
FIG. 2 depicts a rear view of an embodiment of a vehicle with a watercraft rack.
Figure 3:
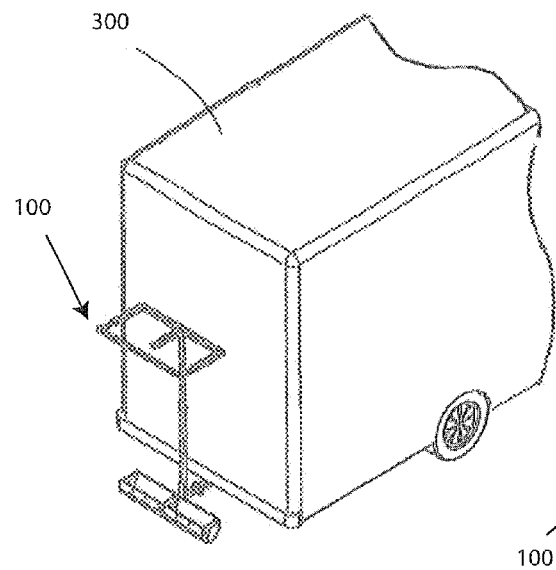
FIG. 3 depicts a top, rear left perspective view of an embodiment of a vehicle with a watercraft rack.
Figure 4:
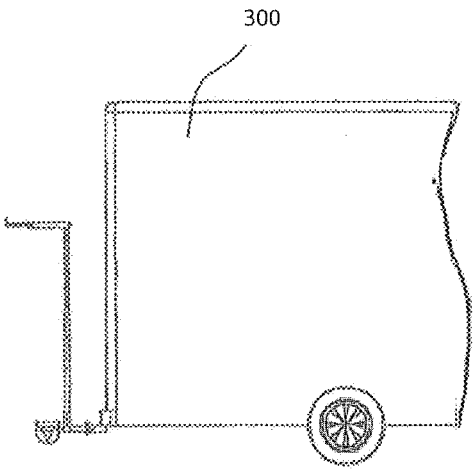
FIG. 4 depicts a side view of an embodiment of a vehicle with a watercraft rack.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of an embodiment. The features and advantages of the present invention are illustrated in detail in the accompanying drawings, wherein like reference numerals refer to like elements throughout the drawings.

Figure 5:
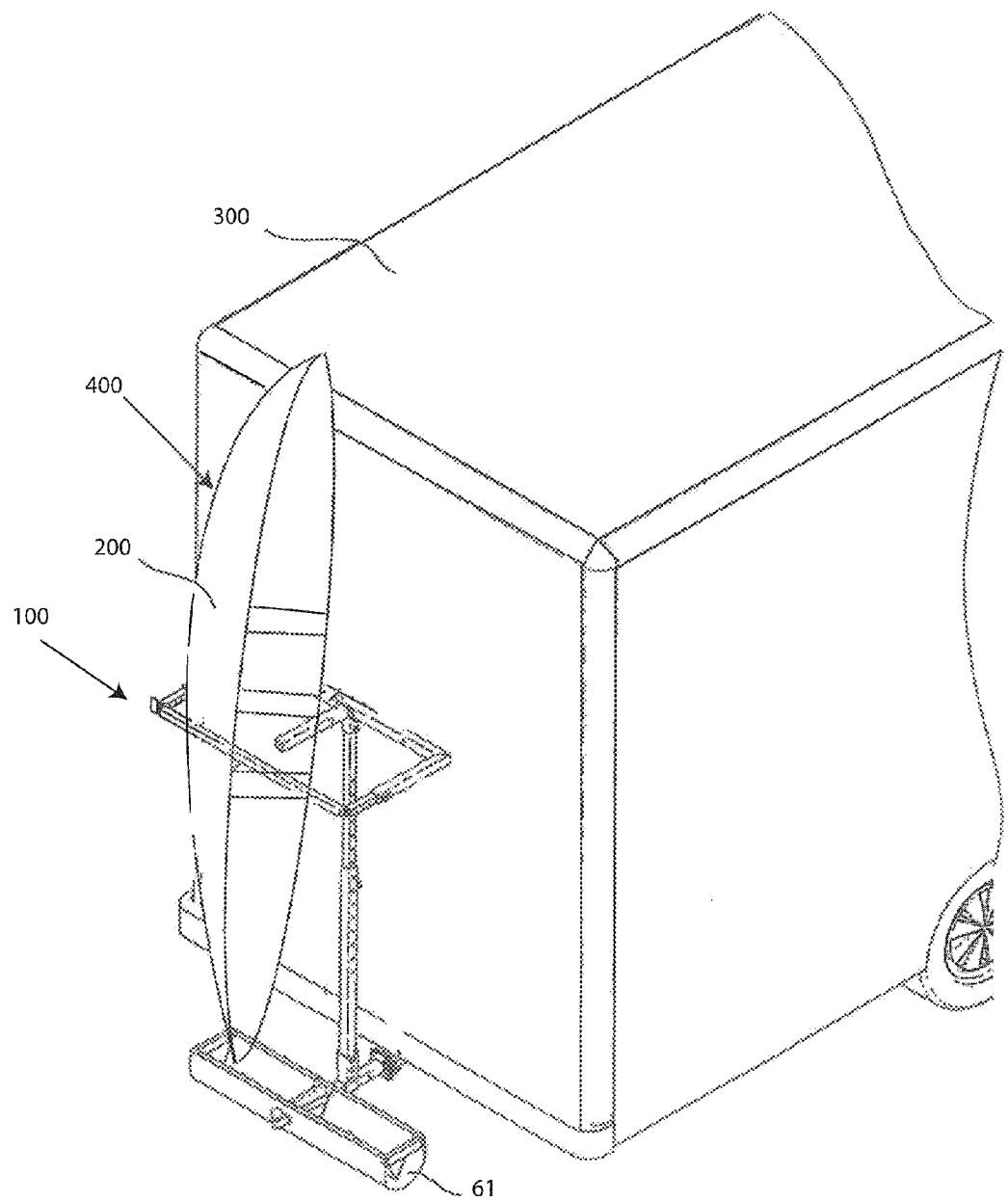
FIG. 5 depicts a perspective view of an embodiment of a watercraft rack attached to a vehicle, wherein a watercraft is in a racked position.

FIGS. 1-4 depict several views of an embodiment of a watercraft rack 100, the watercraft rack 100 being attached to an embodiment of a vehicle 300. FIG. 5 depicts an embodiment of a watercraft rack 100, wherein a watercraft 200 is in a racked position, and the watercraft rack 100 is attached to a vehicle 300. A watercraft 200 may include any device that is designed to maintain buoyancy in water and that may be configured to accommodate a person or persons. A watercraft 200 may accommodate one person, or multiple people at one time while in use on a navigable waterway. The sizes of watercraft 200 vary depending on, inter alia, style, manufacturer, desired design characteristics, targeted performance, etc. Various embodiments of a watercraft 200 may be configured with a boat motor, propelling device, or any mechanical or electrical device that may drive the watercraft 200 in motion through the water. Some examples of a watercraft 200 include, inter alia, a kayak, a canoe, a row boat, paddle boat, small fishing boat, etc. A vehicle 300 may include any transportation unit which may contain, support, include, or provide a standard receiver hitch 43. In many vehicle embodiments, the roof of the vehicle 300 may be close to, or above the height of an average human being, thus making it difficult and inconvenient to secure articles and possessions, such as a watercraft 200, to the roof of a vehicle 300. In addition to the height of the roof of the vehicle 300, the width and length of the vehicle 300 may be of such size as to inconvenience a person when trying to secure article and possessions, such as a watercraft 200. Some examples of a vehicle 300 to which the various embodiments of watercraft racks 100 may be attached to are Recreational Vehicles ("RV") such as motor homes; truck campers; trailers; and any oversized vehicle configured with a receiver hitch 43 known to those skilled in the art. The receiver hitch 43, or trailer hitch receiver 43, may be located at the rear of the vehicle 300, and may be of any shape. In one embodiment, the receiver hitch 43 may be rectangular. In another embodiment, the receiver hitch 43 may be square. In yet another embodiment, the receiver hitch 43 may be cylindrical. The shape of the receiver hitch 43 may correspond with the shape of a lower support member 51 of a watercraft rack 100. Corresponding to the shape of a lower support member 51 means that a lower support member 51 can be inserted into the receiver hitch 43 and rest inside the receiver hitch 43 without easily slipping out of the receiver hitch 43 or providing a loose fit. The lower support member 51 and lower support unit 41 will be discussed infra in greater detail.

Figure 6:
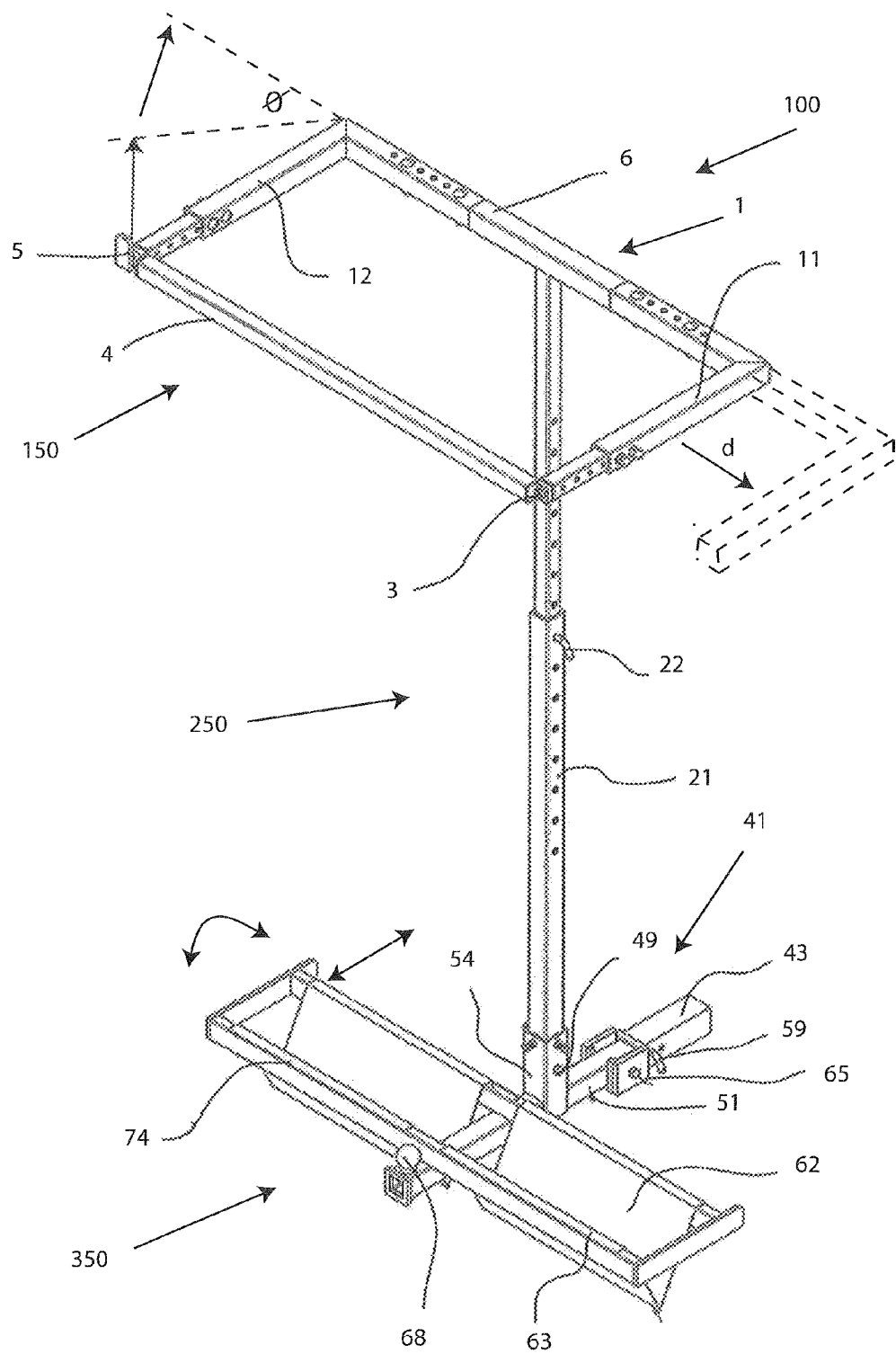
FIG. 6 depicts a perspective view of an embodiment of a watercraft rack.

FIG. 6 depicts an embodiment of a watercraft rack 100, which may have a first end 350 securely engaged with a receiver hitch 43. In many embodiments, the first end 350 may be configured to attach to a receiver hitch 43 of a vehicle 300 and may provide support for the apparatus 100 and a watercraft 200. Alternatively, the first end 350 may be secured to the vehicle 300, such as welded or affixed to the frame of the vehicle 300, welded or affixed to the chassis of the vehicle 300, or the bumper of a vehicle 300. The first end 350 may also accommodate a watercraft 200 when placed within the first end 350. Accommodating a watercraft 200 means, inter alia, suitably contacting a portion of the watercraft 200 such that the watercraft 200 may not freely descend when in a racked position 200. The first end 350 may have a nose cradle 62 attached thereto to further accommodate the watercraft 200 when in a racked position 200. Additionally, the first end 350 may or may not include a protective trough 61 covering a portion of the nose cradle 62. The first end 350 may have a lower support frame 63 discussed in greater detail infra. Spaced apart from the first end 350, a second end 150 may removably enclose a watercraft 200. The second end 150 may include an upper support frame 1, which may include a back member 6, at least two side members 11 and 12, and a locking bar 4. When in a racked position 400, the second end 150 may removably secure a watercraft 200 with a locking bar 4 discussed in greater detail infra. The second end 150 may adjust in size to encompass a watercraft 200 of different sizes. Also, the second end 150 may adjust to encompass more than one watercraft 200 at a time in the racked position 400.

A connecting member 250 may connect the first end 350 with the second end 150. The connecting member 250 may be vertically positioned, so that the watercraft rack 100 may stand upright. The connecting member 250 may connect to the first end 350 and the second end 150 by methods discussed infra and by methods known to those skilled in the art. The connecting member 250 may also adjust incrementally or translationally to allow the watercraft rack 100 to rack watercrafts 200 of different sizes.

With continued reference to FIG. 6, an embodiment of the watercraft rack 100 is shown. The elements, pieces, members, parts, etc. of the entire watercraft rack 100, unless specified otherwise, may be made of, inter alia, steel, aluminum, stainless steel, hard plastics, such as thermoplastics and thermosets, composite materials, such as fiberglass, or any suitable material known to one of skill in the art. The weight of the watercraft rack 100 plus the weight of the watercraft 200 may be supported by the lower support system 41. The lower support system 41 may include a lower support member 51 removably connected with a standard receiver hitch 43, a lower bracing unit 42, and a bottom end securing member 54.

The lower support member 51 may be inserted into the standard receiver hitch 43 and fastened together by the lower bracing unit 42. FIGS. 14-21 depict various embodiments of the lower bracing unit 42. One or more brackets 65 may be used to secure and fasten the lower support member 51 to the standard receiver hitch 43. Vibrations coming from the vehicle 300 or variations in the topography and the surface of the ground (e.g. non-paved surfaces or bumps or cavities located in the surface) may cause the watercraft rack 100 to move up and down, potentially damaging the watercraft 200 enclosed therein. The lower bracing unit 42 may comprise one or more brackets 65 to help prevent the apparatus 100 from moving up and down while the vehicle 300 is in motion. An embodiment shown in FIG. 6 includes two brackets 65 fastened to each other with bolts. Other fastening devices and methods known to those skilled in the art may also be used.

In addition to the lower bracing unit 42, a locking pin 59 may be used to provide a means of securing the lower support member 51 into position inside the standard receiver hitch 43. Through-hole portions 58 may be drilled or bored in the connecting ends of both the lower support member 51 and the standard receiver hitch 43 to allow a locking pin 59 to be inserted. After properly aligning the through-hole portions 58 of the lower support member 51 and the standard receiver hitch 43, a locking pin 59 may be inserted through one or more through-hole portions 58, securing the lower support member 51 inside the standard receiver hitch 43. A bolted connection or rod inserted therein may also be used for securing purposes.

At some point along the lower support member 51, the bottom end of an adjustable vertical frame member 21 may be secured. The bottom end of the adjustable vertical frame member 21 may be secured to the lower support member 51 by a bottom end securing member 54. It is not mandatory that the adjustable vertical frame member 21 be secured using a bottom end securing member 51 as shown in the embodiments; it can be directly connected to the lower support member 51 through a welded connection, or any other fastening method known to those skilled in the art. The lower support member 51 may be square, rectangular, circular, oblong or any functional geometric shape, so long as it can be configured to fit inside the receiver hitch 43 of the same geometric shape (e.g. a circular lower support member might not be used with a receiver hitch with a square opening). Accordingly, the bottom end securing member 54 may then be of any shape, as long as it can form around the outside surface of the lower support member 51, and can be fastened thereto. The bottom end securing member 54 may also be shaped and positioned to be fastened to the lower support member 51 in various methods and arrangements known to those having ordinary skill. The means for fastening the bottom end of the adjustable vertical frame member 21 to the lower support member 51 may include a bolted connection. In other embodiments, the adjustable vertical frame 21 may be secured to the lower support member 51 through welding, or may include both bolted connections and welded connections. In yet another embodiment, the bottom end securing member 54 may contain through-hole portions 49 to provide yet another method of fastening the bottom end of the adjustable vertical frame member 21 to the lower support member 51. The adjustable vertical frame member 21 may also contain through-hole portions 49 and may have a slightly smaller cross-section than the bottom end securing member 54. Other securing methods known to those skilled in the art may also be used.

On the opposite the end of the lower support member 51 that fits inside the receiver hitch 43, the lower support member 51 may be fastened to the lower support frame 63. Continuing to refer to FIG. 6, the lower support frame 63 of watercraft rack 100 may include a rectangular frame, a protective trough 61, a nose cradle 62, and the lower support member 51. The lower support frame 63 may be rectangular in shape, and may be sized such that a portion of a watercraft 200, such as a kayak, can be placed therein. In one embodiment, the entire nose of the watercraft may be placed inside the rectangular frame. To avoid any damage to the watercraft 200 (e.g. chipping of the outer surface, small dents, etc.), a cushioning material may be attached to the inner edges of the lower support frame 63. The width of the lower support frame 63 may be similar to the width of the upper support frame 1 discussed infra. In most embodiments, the width of the lower support frame 63 should be at least wide enough for a portion of a watercraft 200 to be placed therein.

Attached to the outer edges of the lower support frame 63 may be a protective trough 61. The term "trough" is used simply because it resembles the shape of a trough, and is not intended to collect or retain any fluids. The protective trough 61 should not be limited to the ordinary meaning and function of a trough. The protective trough 61 shall be defined according to the disclosures and embodiments contained herein. The protective trough 61 may be a uniform, planar sheet folded over from the back of the lower support frame 63 to the front of the lower support frame 63. The protective trough 61 may be flush with the lower support frame 63 when attached, as shown in FIG. 5, and may extend the width of the lower support frame 63. In the embodiments shown, the protective trough 61 forms a curved portion underneath the nose cradle 62. The protective trough 61 provides, inter alia, protection to the nose cradle 62 and the bow of the watercraft 200 from road debris, road bumps, and any debris kicked up from the tires of the vehicle 300 or any other vehicle traveling nearby. The protective trough 61 may be fastened to the lower support frame 63 with screws, rivets, bolts, nails, construction grade glue, or welded connections.

A portion of the watercraft 200, when in a racked position 400, may extend inside the lower support frame 63, and come into contact with a nose cradle 62. The nose cradle 62 can be attached to the rectangular frame of the lower support frame 63 and converges towards the protective trough 61 or towards the ground surface absent a protective trough 61. In one embodiment, the nose cradle 62 is triangular in shape, having two sloped sides, coming to a point. The nose cradle may extend the width of the lower support frame 63, and the size may vary to accommodate various watercrafts 200. The size of the nose cradle 62 may vary by increasing or decreasing the angle to which the nose cradle 62 opens up. For example, if the nose cradle 62 has a wider angle, the portion of the watercraft 200 placed therein will likely be larger or less narrow. Conversely, if the angle of the nose cradle 62 is decreased, the portion of the watercraft placed therein will likely be smaller or narrower.

Moreover, the lower support frame 63 may be adjustable in a forward or rearward direction to accommodate various sizes of watercraft 200. To effectuate the adjustability of the nose cradle 62, the lower support frame 63 may slide forward or backward along the lower support member 51, while the nose cradle 62 is fastened to the lower support frame 63. Because the nose cradle 62 may be fastened to the lower support frame 63, the location of the nose cradle 62 may be moved to anywhere along the lower support member 51. The sliding motion of the lower support frame 63 may be accomplished by a roller system, tracks, or any method known to those skilled in the art. Additionally, the nose cradle 62 may be tiltable to accommodate various shapes and sizes of the nose or bow of a watercraft 200, and for convenience of loading a watercraft 200 into a watercraft rack 100. Tiltable may be defined as the movement of the nose cradle 62 back and forth along an axis perpendicular to the lower support member 51. The nose cradle 62 may be a uniform, planar surface, or the nose cradle may be mesh netting, or a combination thereof. Furthermore, the nose cradle 62 can be outfitted with a cushioning material to prevent any minor damage to the watercraft 200 while in a racked position 400. The nose cradle 62, inter alia, prevents the watercraft from sliding around while in a racked position 400, and provides extra support for the weight of the watercraft 200. In addition to being outfitted with a cushioning material, the nose cradle 62 may be outfitted with a material or a surface that prevents slipping, such as treads, a non-slip surface, or fine sandpaper.

The watercraft rack 100 may hold, rack, mount, support, transport, carry, etc. more than one watercraft 200 at a time while in a racked position 400. In many embodiments, the watercraft rack 100 will have at least two nose cradles 62 to simultaneously encompass at least two watercrafts 200. When more than one watercraft 200 is placed into the watercraft rack 100, one watercraft 200 may come into contact with one nose cradle 62, while a second watercraft 200 may come into contact with a second nose cradle 62. Thus, two watercrafts may be in a racked position 400 side by side, wherein a portion of each watercraft 200 may come into contact with its own nose cradle 62, Furthermore, watercraft rack embodiment 100 may include a ball hitch 68 attached to the distal end (relative to the back of a vehicle 300) of the lower support member 51. The ball hitch 68 may allow a vehicle 300, such as an RV, to tow another object while still occupying the receiver hitch 43 with the watercraft rack 101. The ball hitch 68 used herein may also be modified and configured to be used with other devices known to those skilled in the art, such as configuring the ball hitch 68 to hang license plates, run electric wire to provide a brake light system, etc.

Referring again to FIG. 6, a watercraft rack 100 may have an upper support frame 1, which may include at least two side members 11 and 12, at least one back member 6, a locking bar 4, a hinge assembly 3, and a locking mechanism 5. The upper support frame 1 may form a rectangular shape, and should be sized large enough to enclose or encompass an average size kayak. However, the size, in particular the depth, of the upper support frame 1 may be adjusted because one or both of the side members 11 and 12 may be slidably adjustable. In general, side members 11 and 12 may extend outwardly from the back member 6 to allow a watercraft 200 to be enclosed within the boundaries of the upper support frame 1. For purposes of simplicity, the examples used herein incorporate just two adjustable side members 11 and 12. It should be understood that there may be more than two side members 11 and 12, which shall be discussed infra. Side members 11 and 12 may each consist of two portions, wherein one of the portions has a larger cross-section as to allow the other portion to fit inside, as shown in FIG. 6. The portion of side member 11 and 12 that has a smaller cross-section and fits inside the other portion may contain through-hole portions. To adjust side members 11 and 12, the through-hole portions located on the side members 11 and 12 may be used to insert a bolt, rod, or locking pin through the holes, thus locking the side members 11 and 12 into position incrementally. The incrementally and horizontal adjustability of the side members 11 and 12 allow a user to vary the depth of the upper support frame 1 to a desired dimension, mainly to encompass a watercraft 200 of different size and shape. The side members 11 and 12 may also be slidably movable. For example, the side members 11 and 12 may incorporate a roller and bracket system to allow one portion to slidably extend inwards and outwards (i.e. horizontally). In another embodiment, side members 11 and 12 may incorporate a ball and dimple system to allow horizontal adjustment. Any method known to those having skill in the art to allow horizontal adjustment of one or more side members 11 and 12 may be used. The side members 11 and 12 can be cylindrical, rectangular, triangular, etc.

Connecting one side member 11 to another side member 12 may be a back member 6. In many embodiments, the back member 6 may attach to the side members perpendicularly, forming a 90° angle. However, in various embodiments, the beck member 6 may be adjustable similar to one or both of the side members 11 and 12, discussed supra, to encompass a watercraft 200 of larger dimensions. In still further embodiments, the back member 6 may include a hinge to angularly pivot outwardly at an angle, Ø, to encompass a watercraft 200 of larger or awkward dimensions. Furthermore, the back member 6 may be curved to accommodate various watercrafts 200. The connection may be a traditional welded connection, or could involve a hinging mechanism, a bolted connection, or any reasonable fastening method known to those having skill in the art. The back member 6 usually corresponds to the same cross-section and geometric shape as side members 11 and 12. The size (i.e. length) of the back member 6 may determine the width of the watercraft rack 100, which must be wider than a small-to-average size watercraft 200. In one embodiment, the back member 6 may be wide enough to fit one average sized watercraft 200 within the boundaries of the upper support frame 1. In another embodiment, the back member 6 may wide enough to fit two average sized watercrafts within the boundaries of the upper support frame 1. In yet another embodiment, the back member 6 may be as wide as to fit more than 2 watercrafts within the boundaries of the upper support frame 1. Embodiments of a watercraft rack 100 may not have a back member 6, but may include side members 11 and 12 attached directly to the adjustable vertical frame 21, which may serve as a connecting member 250 between the first end 350 and the second end 150 of the watercraft rack 100. The side members 11 and 12 and the back member 6 may be configured with electric wire to allow a brake lighting system, or any other purpose for electric wire, such as decorative or cautionary lights.

Attached to one of the side members 11 and 12, may be a hinge assembly 3, which allows a locking bar 4 to enclose a watercraft 200. The hinge assembly 3 may include a ball and socket joint that allows multi-directional movement of the locking bar 4. Because the hinge assembly 3 may allow the locking bar 4 to freely move in a circular, multi-directional fashion, the locking bar 4 does not become an obstacle when operating the watercraft rack 100. On the contrary, the hinge assembly 3 may be an ordinary hinging assembly known to those skilled in the art. The hinging assembly 3 may be located on the distal end of a side member 11 opposite the end that is in contact with the back member 6. The locking bar 4 may hinge or pivot towards another side member 12, wherein a locking clip 5, located on the distal end of a side member 12 opposite the end that is in contact with the back member 6, may help fasten or securably house the distal end of the locking bar 4. In one embodiment, the distal end of the locking bar 4 may have a rod, hook, pin, etc. that may fasten to the locking clip 5. In another embodiment, the distal end of the locking bar 4 may have a rod, hook, pin, etc. that may be securably housed or in continuous communication with the locking clip 5. In other embodiments, the locking bar 4 may be completely removed from the watercraft rack 100, and the upper support frame 1 may not contain a hinge assembly 3 or locking mechanism 5. Thus, the locking bar 4 can open and close as to allow a user to place a watercraft 200 into the watercraft rack 100. Closing the locking bar 4 after a watercraft 200 has been placed therein may serve to enclose the watercraft 200 within the boundaries of the upper support frame 1, and, inter alia, may prevent the watercraft 200 from possibly becoming separated from the watercraft rack 100 (i.e. falling off, slipping out, tipping over). It may be advantageous to adjust the side members 11 and 12 so that when a watercraft 200 is in a racked position 400, and the locking bar 4 is in the closed position, the watercraft 200 fits snugly within the boundaries of the upper support frame 1. Additionally, a cable may be attached somewhere on the watercraft rack 100 to wrap around the watercraft 200 to add security. Furthermore, any cushioning material, such as neoprene, rubber, foam, etc. may be affixed to the upper support frame 1 and locking bar 4 to prevent or minimize damage to the watercraft 200, which may occur if the watercraft 200 is not fit snugly within the boundaries of the upper support frame 1. In addition, the locking bar 4 and/or the side bars 11, 12 may be replaced by a chain, a strap, bungee cord, webbing, rope, or other flexible securement device. For example, a winch may be used to pull the device to be secured in a taught manner.

With continued reference to FIG. 6, an adjustable vertical frame member 21 may connect the lower support member 51 and lower support frame 63 with the upper support frame 1, and may vertically extend a distance beginning from the receiver hitch 43 to at or near the roof of a vehicle 300. As described supra, the adjustable vertical frame member 21 attaches to the lower support member 51 via the bottom end securing member 54. The adjustable vertical frame member 21 attaches to the upper support frame 1 via a top end securing member 55, in a similar fashion as the bottom end securing member 54 discussed supra. The adjustable vertical frame member 21 may consist of two portions, one portion having a smaller cross section than the other as to allow the portion with the smaller cross section to fit snugly inside the other portion. Both portions of the adjustable vertical frame member 21 may have through-hole portions drilled or bored so as to allow a rod, bolt, or locking pin to be inserted therein. A user may slide one portion of the adjustable vertical frame 21 up or down to a desired height, and insert a rod, bolt, or locking pin through the through-hole portions to lock the adjustable vertical frame member 21 into place. Thus, the adjustable vertical frame member 21 can be incrementally adjusted up or down to corresponding to the height of the watercraft 200. For example, the height adjustable vertical frame member 21 could be raised to encompass a taller or larger watercraft 200. Conversely, the height of the adjustable vertical frame member 21 could be lowered to encompass a shorter or smaller watercraft 200. Furthermore, the height of the adjustable vertical frame member 21 could be raised or lower for the convenience of the user (e.g. shorter person might lower the height to more easily secure the watercraft into position.). In another embodiment, the adjustable vertical frame member 21 may be slidably movable. For example, the adjustable vertical frame member 21 may incorporate a roller and bracket system to allow one portion to slidably extend up or down (i.e. vertically). In another embodiment, the adjustable vertical frame member 21 may incorporate a ball and dimple system to allow vertical adjustment. Any method known to those having skill in the art to allow vertical or translational adjustment may be used. The adjustable vertical frame member 21 can be cylindrical, rectangular, triangular, etc, but should substantially correspond to the shapes of both the top end securing member 55 and the bottom end securing member 54. The adjustable vertical member 21 need not be adjustable; it may nonetheless be a rigid, solid member.

Figure 7:
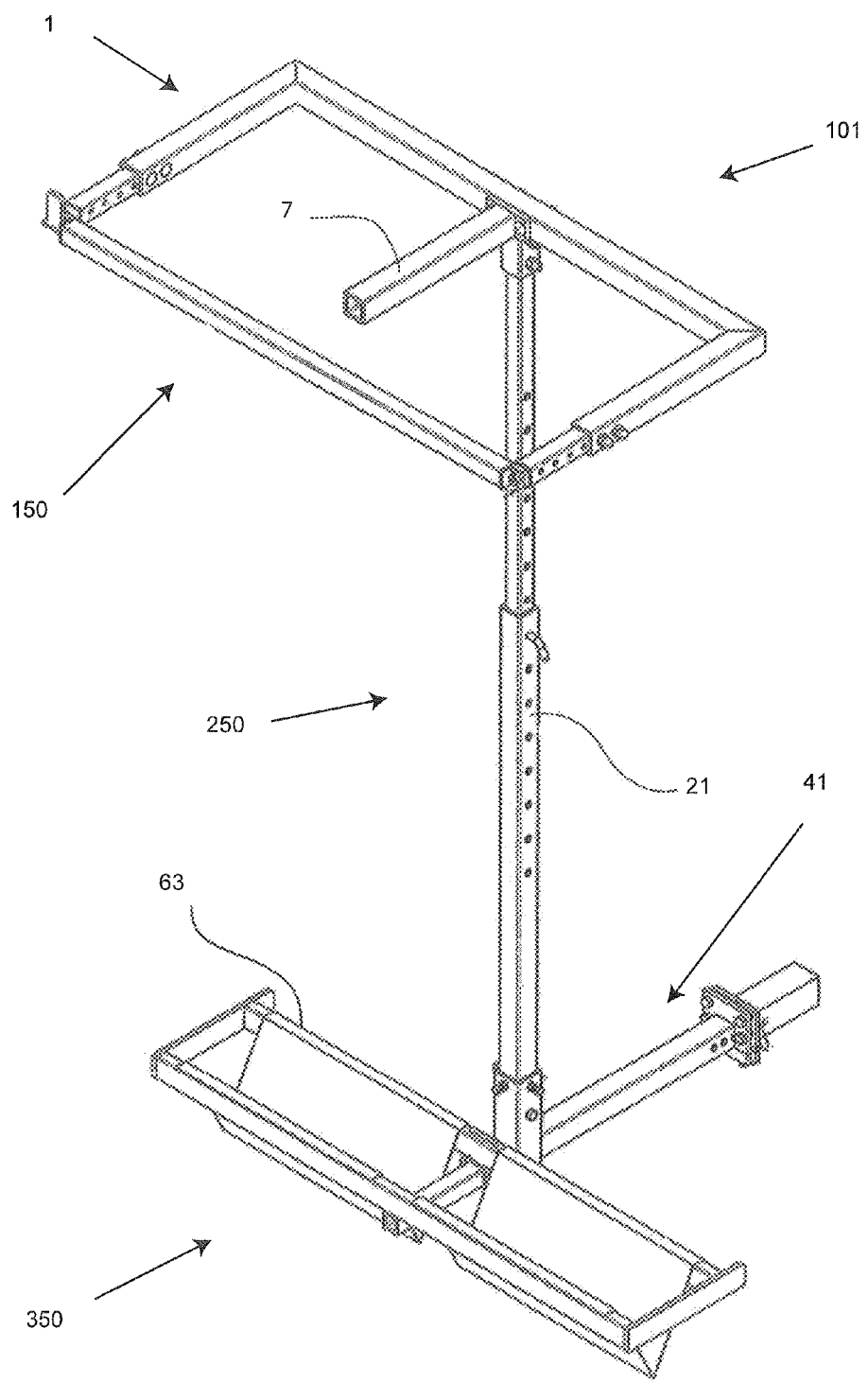
FIG. 7 depicts a perspective view of an embodiment of a watercraft rack, wherein the watercraft rack has a separating member.

Referring now to FIG. 7, somewhere along the back member 6, a separating member 7 may be perpendicularly attached. The separating member 7 may extend outward from the back member 6 a distance toward the locking bar 4. In one embodiment, the separating member 7 may be rigidly fastened to the back member 6. In another embodiment, the separating member 7 may be fastened in such a way as to allow horizontal movement along the back member 6. Such a fastening device may include a bracket and bolt, wherein the bolt can be loosened to allow the bracket to be repositioned at another location on the back member, and tightened when in a desired location. The separating member 7 may or may not be present in the watercraft rack 100 when the watercraft 200 is in the racked position 400. The separating member 7 can, inter alia, minimize movement of the watercraft 200 while in the racked position 400, and may be beneficial when two or more watercrafts 200 are present in the watercraft rack 100.

Figure 8:
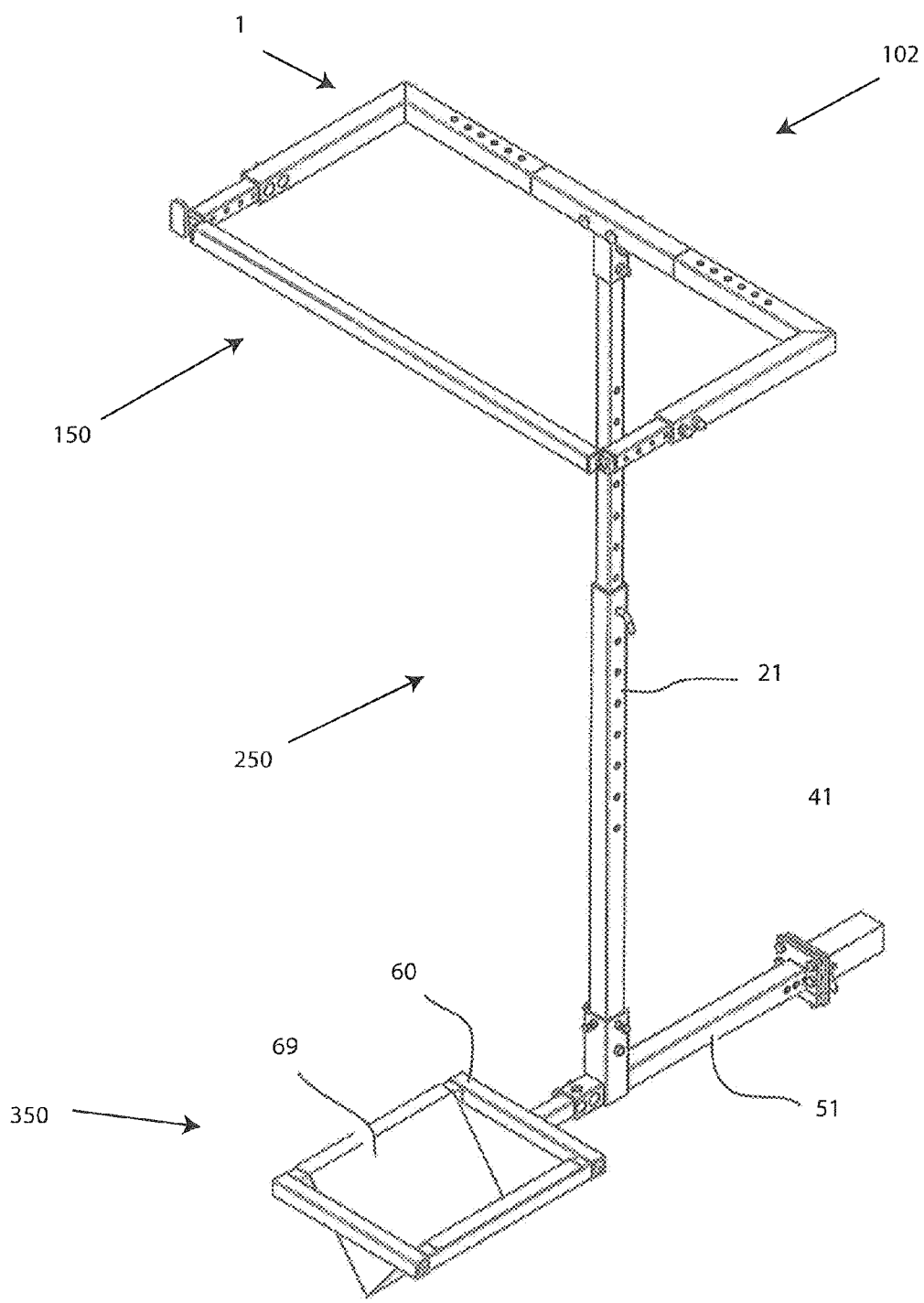
FIG. 8 depicts a perspective view of an embodiment of a watercraft rack; wherein the watercraft rack is configured for larger watercraft.

Referring now to FIG. 8, an embodiment of a watercraft rack 102 is shown. One difference between watercraft rack embodiment 100 and watercraft rack embodiment 102 is that the lower support frame 60 has more of a squared orientation. Additionally, the nose cradle 69 in watercraft rack 102 has a 90° clockwise orientation of the nose cradle 62 in watercraft rack 100, or some other angled orientation with respect to the direction of the lower support member 51. The protective trough 61 may or not be present in watercraft rack 102. Also, the separating member 7 may or may not be present in watercraft rack 102. Watercraft rack 102 may be beneficial when desiring to rack, carry, transport, mount, and/or support a larger watercraft 200 on a vehicle. For example, the types of watercraft 200 that may benefit from watercraft 102 include, inter alia, a canoe, row boat, or small fishing boat.

Figure 9:
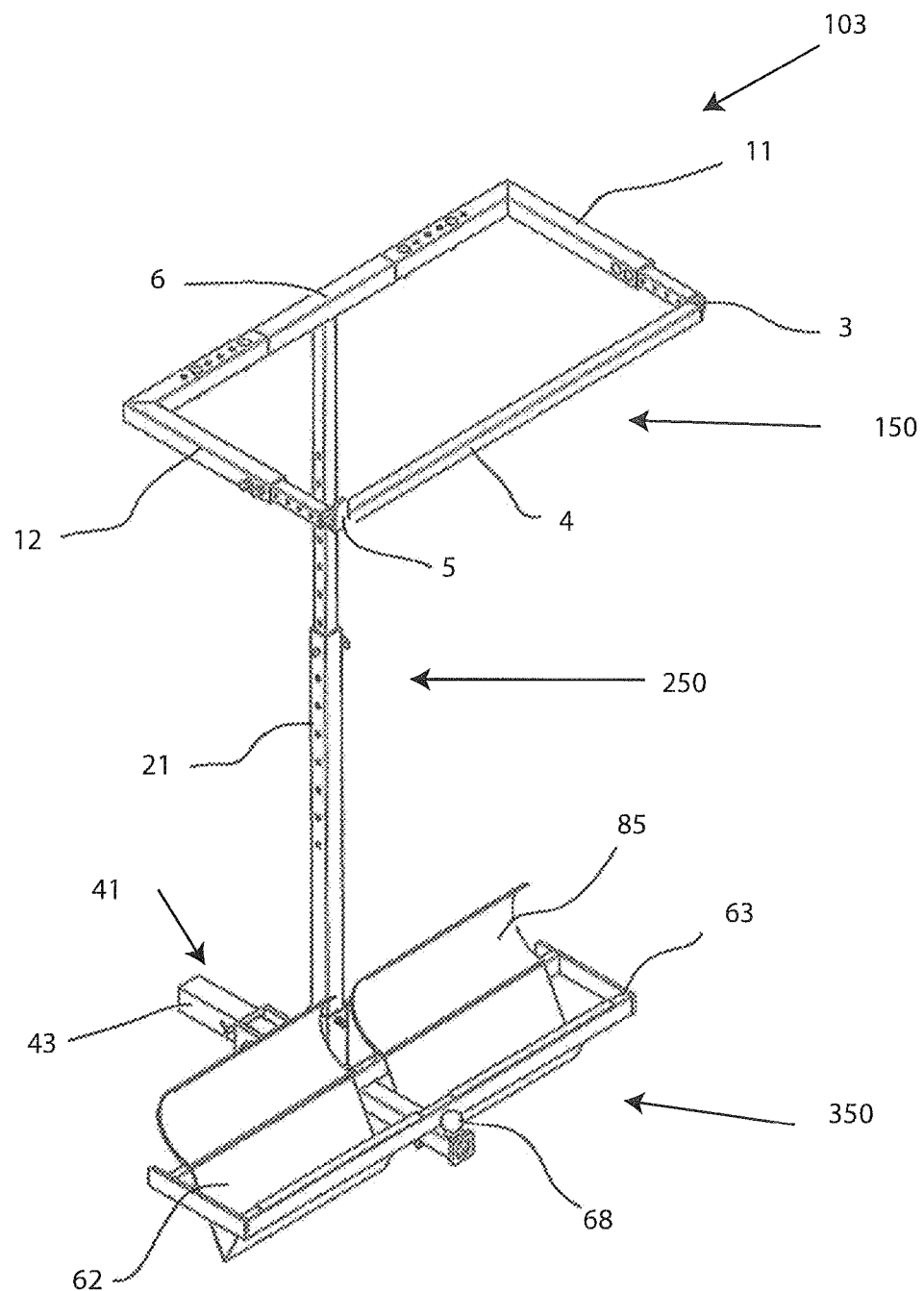
FIG. 9 depicts a perspective view of an embodiment of a watercraft, wherein a guide piece is positioned above the nose cradle.
Figure 10:
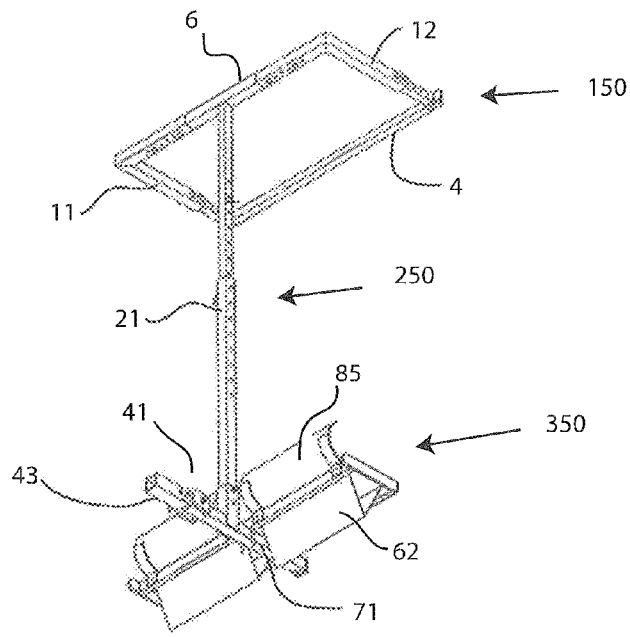
FIG. 10 depicts a rear perspective view of an embodiment of a watercraft, wherein a guide piece is positioned above the nose cradle.
Figure 11:
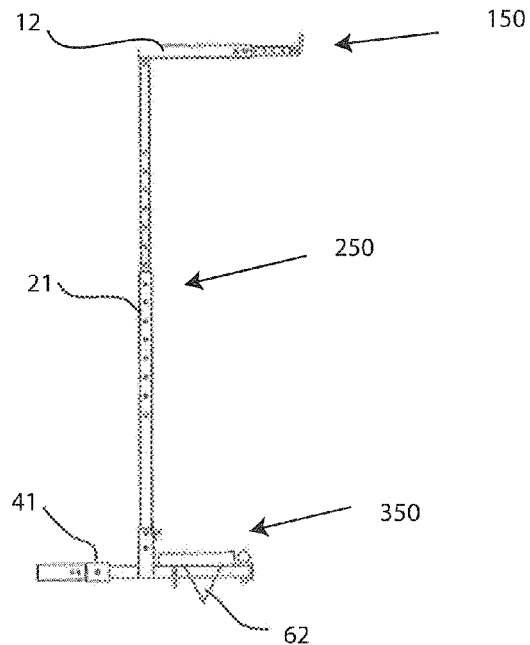
FIG. 11 depicts a side view of an embodiment of a watercraft.
Figure 12:
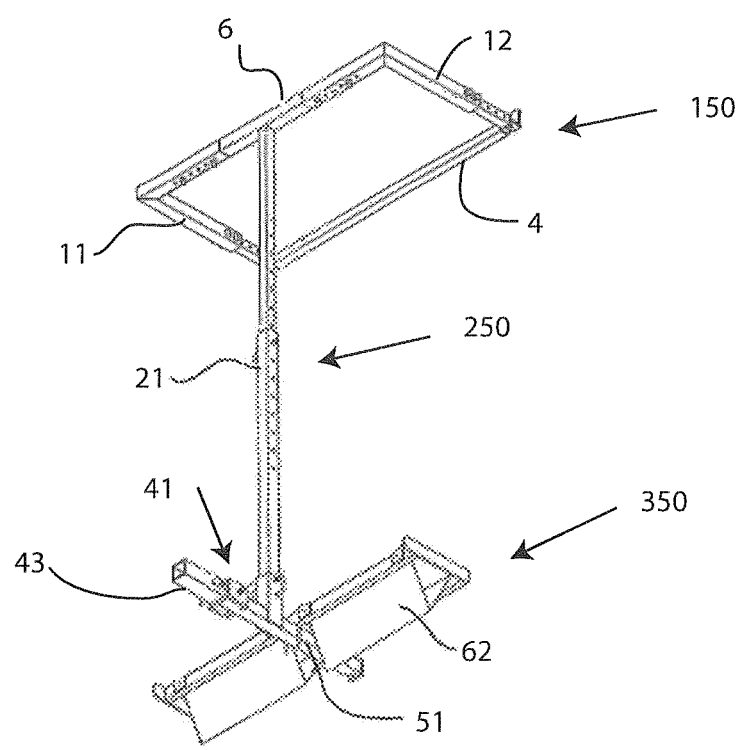
FIG. 12 depicts a rear perspective view of an embodiment of a watercraft.

FIG. 9 depicts an embodiment of a watercraft 103, wherein a guide piece 65 is positioned above the nose cradle 62. The guide piece 85 may be curved or arced to facilitate the entry of a nose or bow of a watercraft 200 into the nose cradle 62. The guide piece 85 may be fastened to the lower support frame 63. Moreover, the guide piece 85 may be constructed out of aluminum, steel, composite, plastic, or any material sufficiently rigid to accept contact from a watercraft 200 and not bend.

Figure 13:
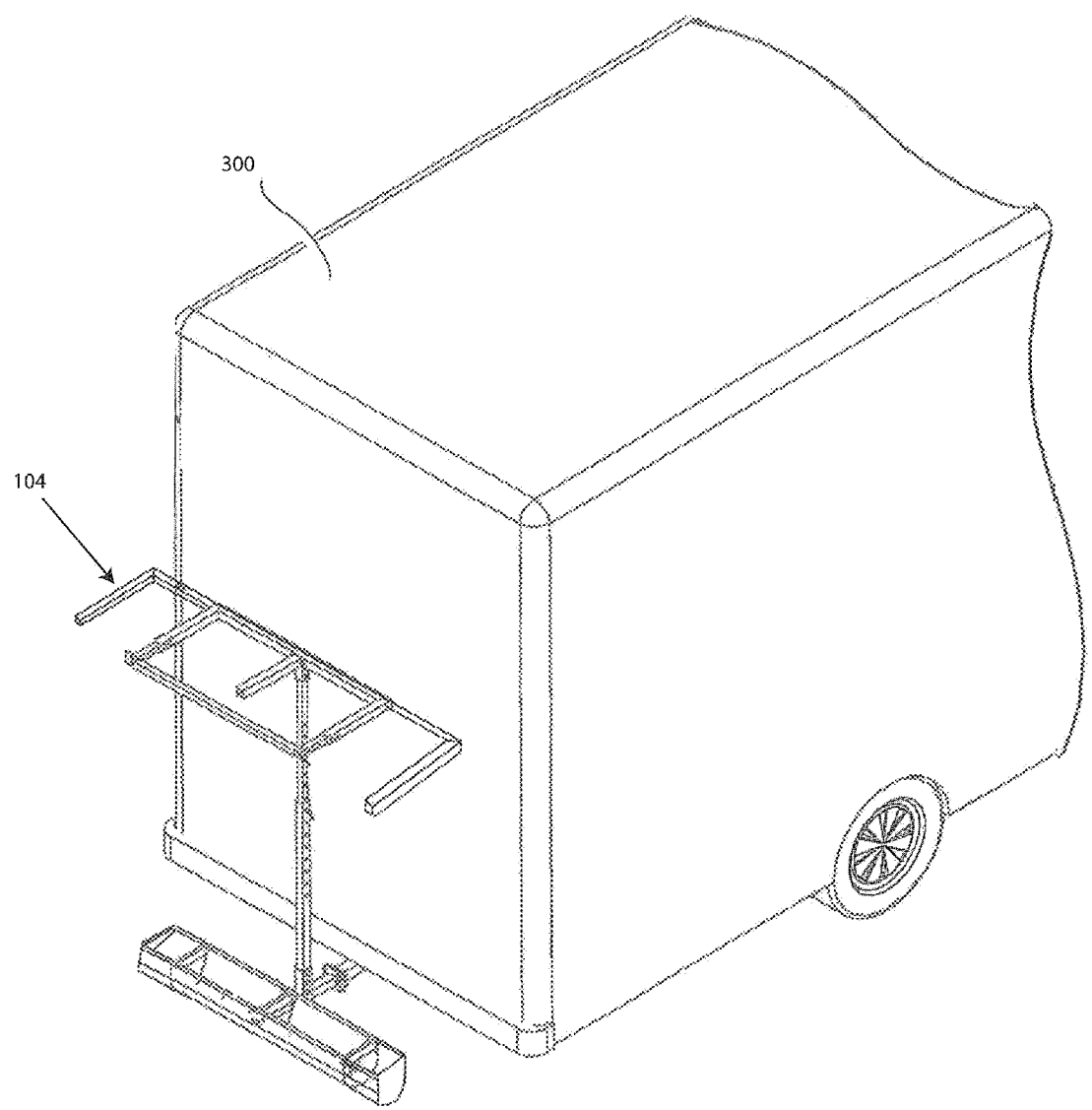
FIG. 13 depicts a perspective view of an embodiment of watercraft attached to a vehicle, wherein an embodiment of a watercraft has more than 2 side members and an extended nose cradle.
Figure 14:
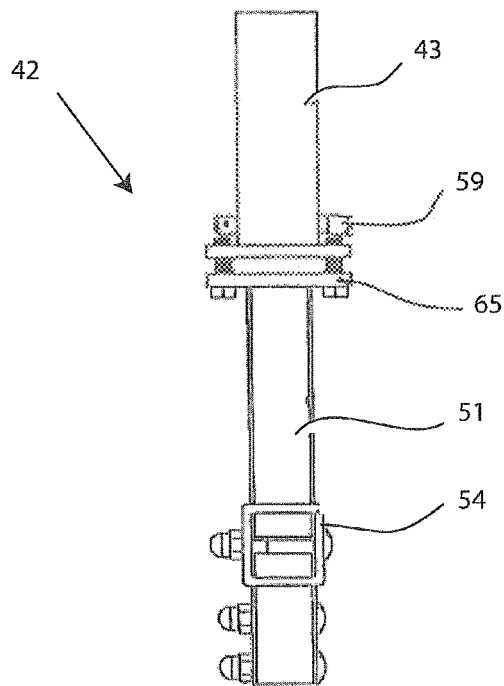
FIG. 14 depicts a top view of an embodiment of a lower support system.
Figure 15:
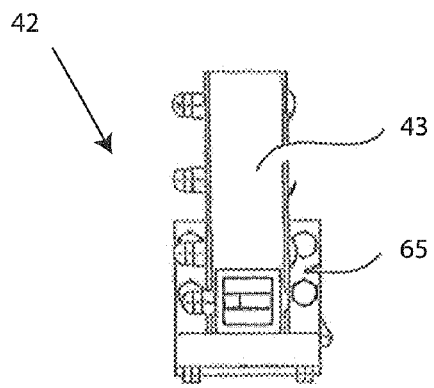
FIG. 15 depicts a front view of an embodiment of a lower support system.
Figure 16:
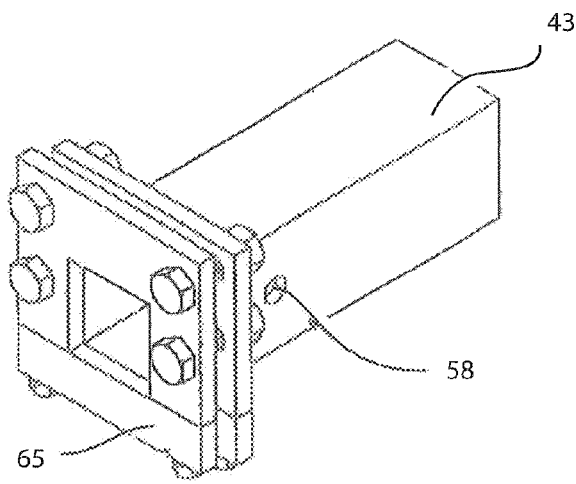
FIG. 16 depicts a perspective view of an embodiment of a lower support system.
Figure 17:
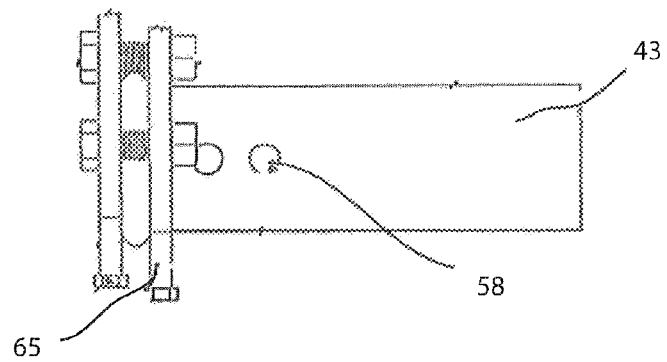
FIG. 17 depicts a side view of an embodiment of a lower support system.
Figure 18:
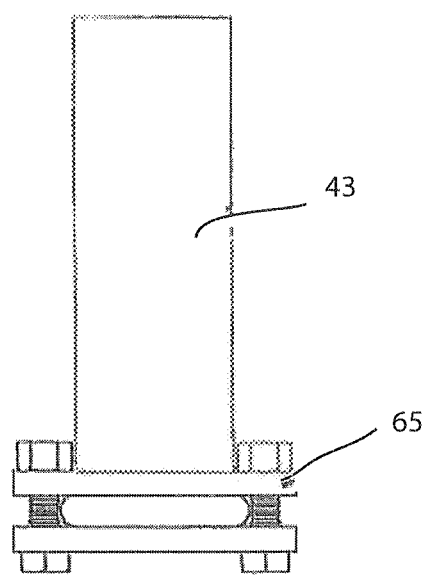
FIG. 18 depicts a top view of an embodiment of a receiver hitch and brackets.
Figure 19:
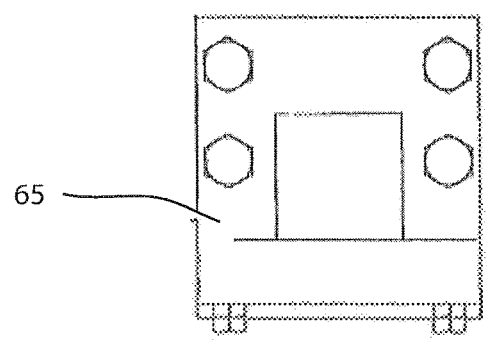
FIG. 19 depicts a front view of an embodiment of a standard receiver hitch and an embodiment of a bracing unit.
Figure 20:
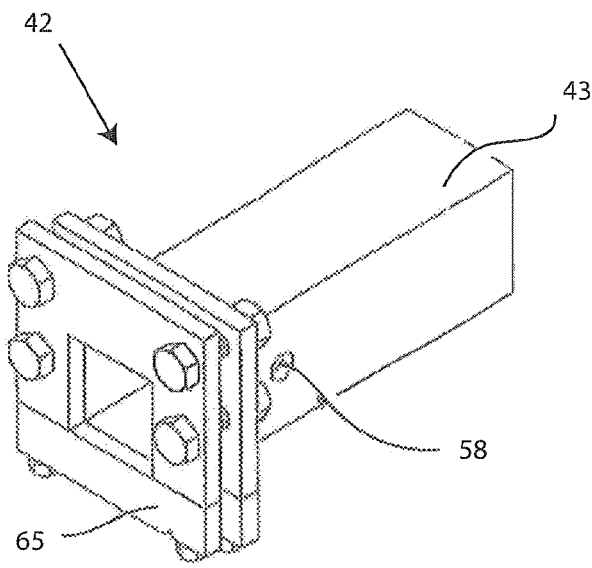
FIG. 20 depicts a perspective view of an embodiment of a bracing unit.
Figure 21:
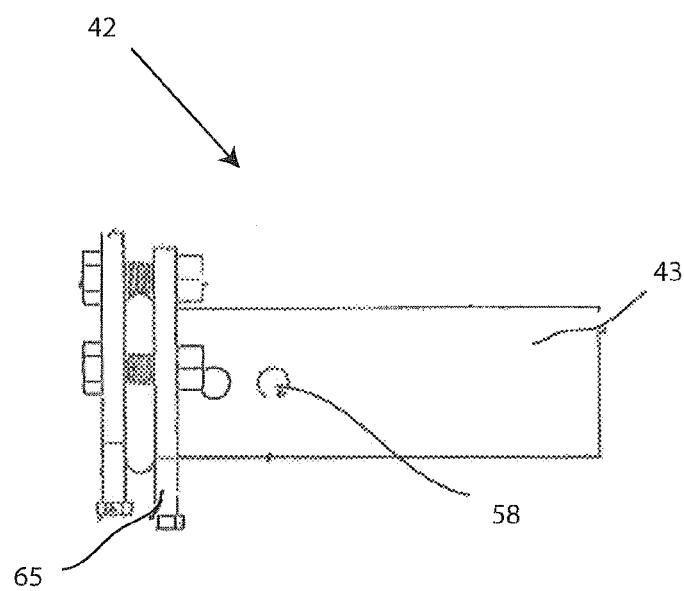
FIG. 21 depicts a side view of a standard receiver hitch and an embodiment of a bracing unit.

Referring now to FIG. 13, an embodiment of watercraft rack 104 is shown. FIG. 13 embodies a watercraft rack 103 wherein a third or more side member 11' and 12', and second or more back member 6' may be used. Additionally, watercraft rack 104 may extend the lower support frame 63 horizontally to allow another watercraft 200 to be placed therein. Extending the lower support frame 63 also may include extending the nose cradle 62 and the protective trough 61 to securely support multiple watercrafts 200.

Figure 22:
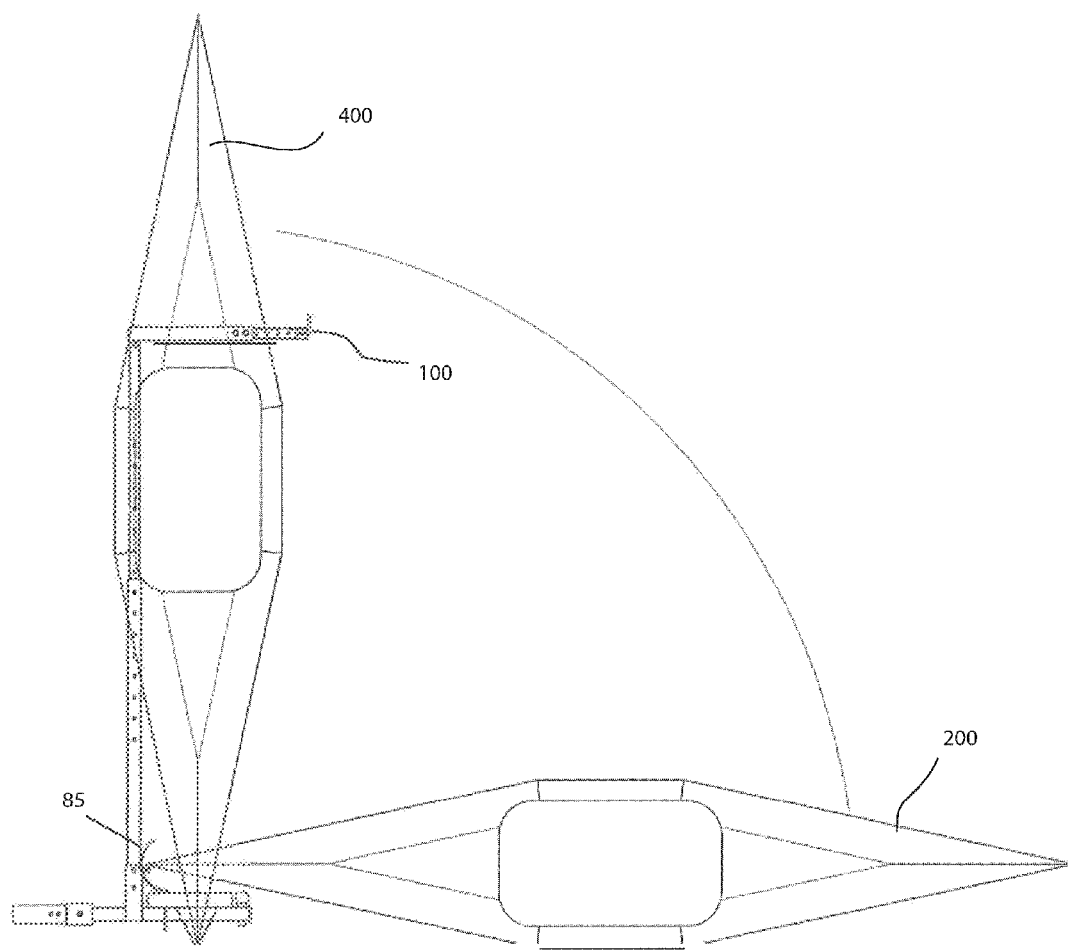
FIG. 22 depicts a side view of an embodiment of a method of racking a watercraft.

Depicted in FIG. 22 is an embodiment of a method of racking a watercraft. A method of racking a watercraft 200 may comprise the steps of providing a watercraft rack 100 including a first end 350 having a lower support frame 63, a connecting member connecting the first end 350 to a spaced apart second end 150, the second end 150 having an upper support frame 1; removably engaging the first end 150 of the watercraft rack 100 with a standard receiving hitch 68; accommodating a portion of a watercraft 200 with the first end 150; and removably enclosing another portion of the watercraft 200 within the second end 350. In one embodiment, the watercraft 200 may be lifted and the nose of the watercraft 200 may be placed in contact with the guide piece 85 or the nose cradle 62. Thereafter, the watercraft may be lifted towards the upper support frame 1 until the watercraft comes into contact with the back member 6. Then, the watercraft may be removably enclosed by the locking bar 4 and secured into place in its racked position 400.

The various parts, components, members, etc. of a watercraft rack 100 may be constructed with steel, aluminum, composites, hard plastics, similar structures and the like. The following examples represent only one embodiment of the watercraft rack 100, and in no way limits the design, structure, materials, or dimensions, of the invention, and those with skill in the art appreciate that different sizes and materials can be used in accordance with the invention. In one embodiment, the upper support frame may consist of 1 to 2" square stainless steel tubing with a gage thickness of ⅛" to ¼". The locking bar 4 may consist of 1 to 1½" square stainless 304 steel tubing with a gage thickness of 3/16". The adjustable vertical frame 21 may consist of 2 to 2½" square stainless steel tubing with a gage thickness of ¼". The brackets 65 may consist of ½" thick cold rolled steel to ⅜" thick cold rolled steel. The lower support frame member 51 may consist of 2½" to 3" square steel with a gage thickness of ¼". The nose cradle 62 may consist of 16-gage to 20-gage stainless steel. Furthermore, the various members, components and the like may be hollow, tubular, or semi-solid.

Figure 23:
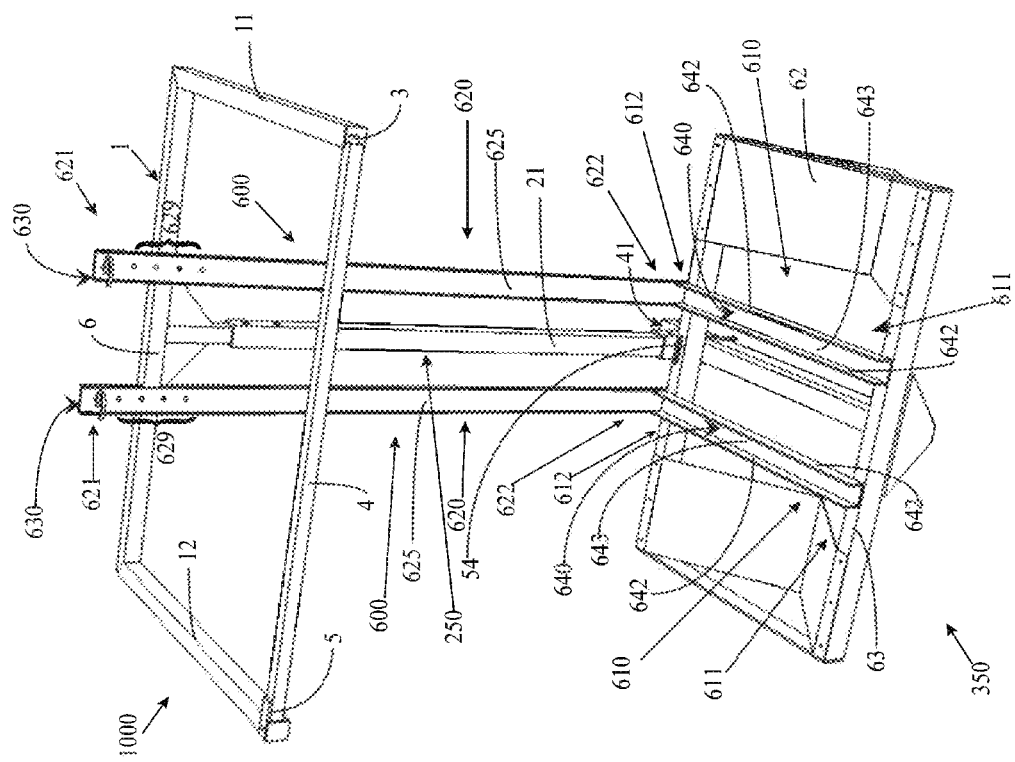
FIG. 23 depicts a perspective view of an embodiment of a multi-purpose rack.
Figure 24:
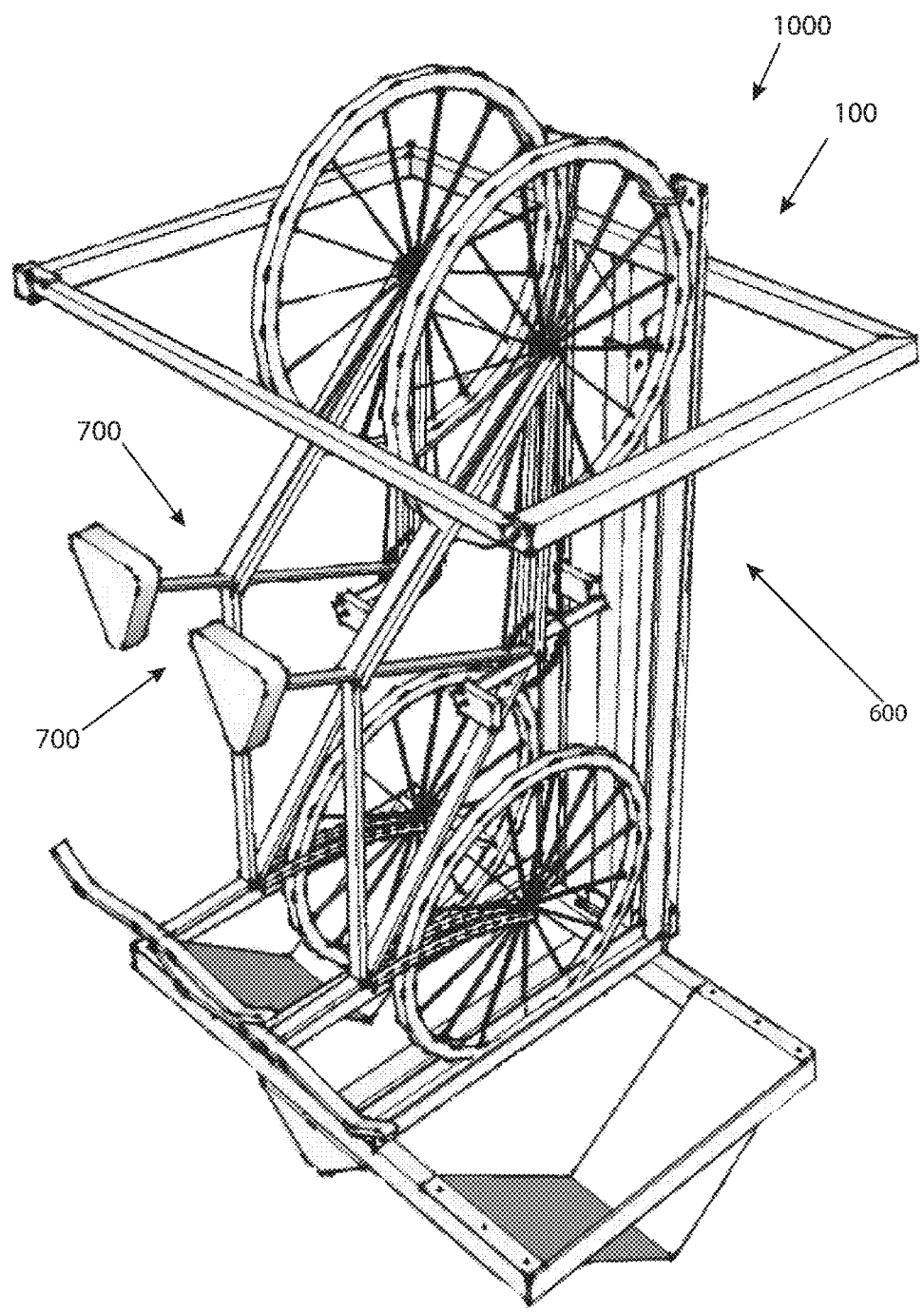
FIG. 24 depicts a perspective view of an embodiment of the multi-purpose rack supporting one or more transportation devices in a racked position.
Figure 25A:
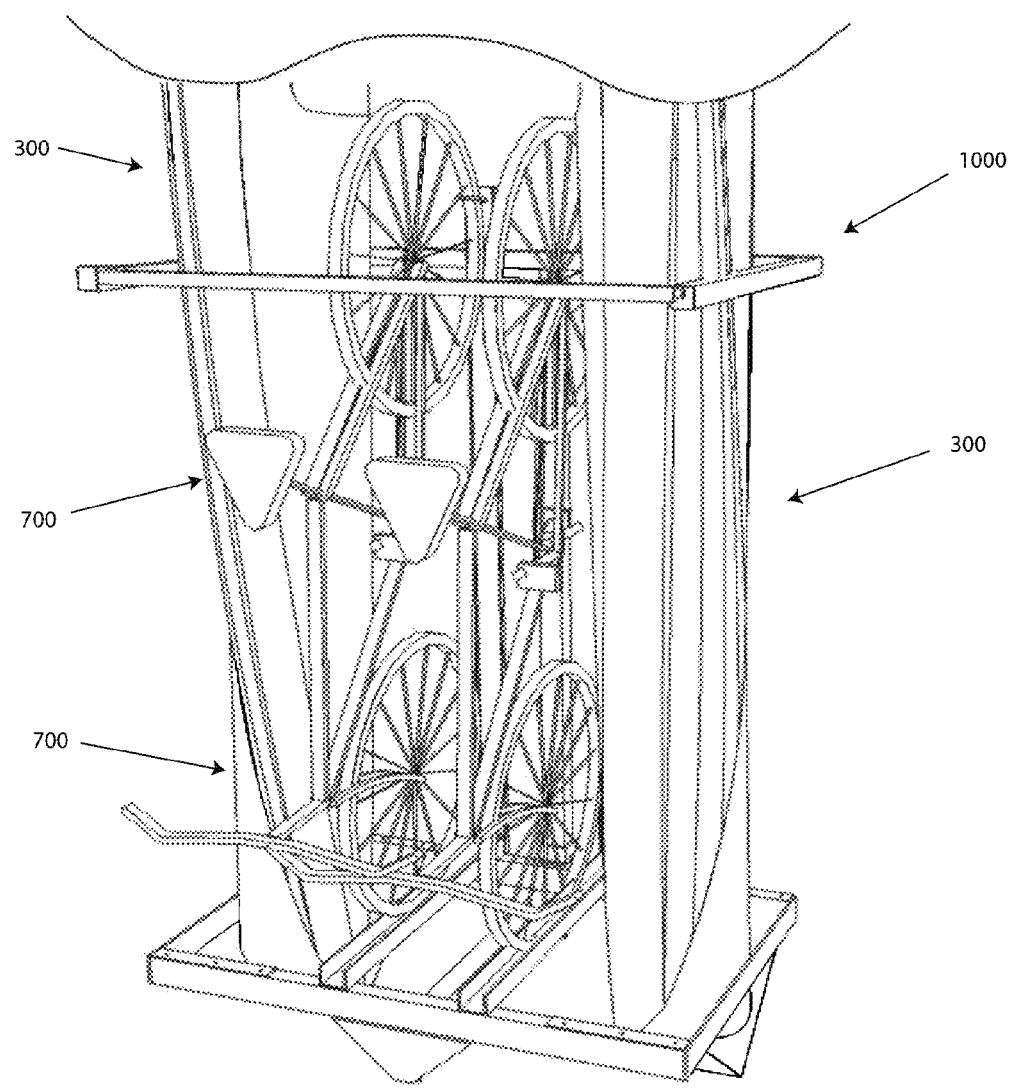
FIG. 25A depicts a front perspective view of an embodiment of the multi-purpose rack supporting one or more watercraft and one or more transportation devices in a racked position.
Figure 25B:
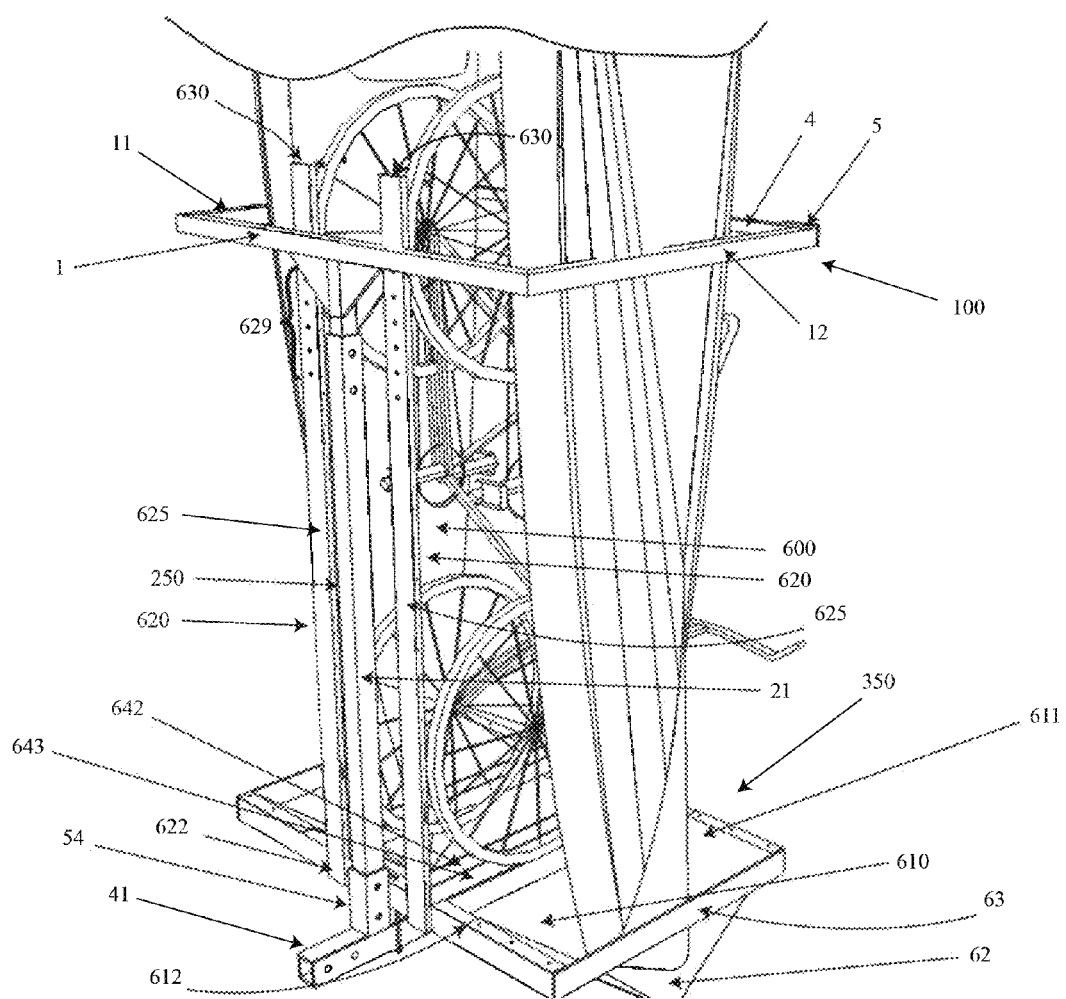
FIG. 25B depicts a rear perspective view of an embodiment of the multi-purpose rack supporting one or more watercraft and one or more transportation devices in a racked position.

Continuing to refer to the drawings, FIG. 23 depicts an embodiment of a multi-purpose rack 1000. Embodiments of the rack 1000 may include the same or substantially the same structure and function as rack 100, 101, 102 described supra. However, rack 1000 may also include a transportation device racking portion 600. In other words, embodiments of the multi-purpose rack 1000 may include the same components as the watercraft rack 100, 101, 102 to effectively rack one or more watercraft 300, yet may also include a transportation device racking portion 600 to effectively rack a bicycle, or other means of transportation having at least one wheel. Embodiments of rack 1000 may include one or more transportation device racking portions 600. For example, rack 1000 may include two transportation device racking portions 600 to accommodate two transportation devices 700, as shown in FIGS. 24 and 25A-25B. Embodiments of rack 1000 should not be limited to two transportation device racking portions 600; there may be more than two mounted onto rack 1000 to accommodate more than two transportation means 700, especially if a user decides to not rack a kayak, or rack only a single kayak, which may free up space for the addition of more transportation devices 700. Embodiments of a transportation device 700 may be a bicycle, cycle, mountain bike, dirt bike, BMX bike, moped, or any transportation means that includes at least one tire or wheel. Furthermore, rack 1000 may be configured to engage a vehicle element, such as a receiver or trailer hitch located at a rear of a RV, similar to rack 100, 101, 102. Furthermore, embodiments of rack 1000 may include a lower support unit 41 configured to engage a vehicle 300, a lower support frame 63 operably connected to the lower support unit 41, the lower support frame 63 configured to accommodate a first portion of a watercraft 200, an upper support frame 1 having at least two side members 11, 12 and a locking member 4 to form an enclosure about a second portion of the watercraft 200, a track element 640 operably connected to the lower support frame 63, the track element 640 configured to accommodate a first portion of a transportation means 700, and a securing element 630 proximate the upper support frame 1, the securing element 630 configured to engage a second portion of the transportation means 700.

Embodiments of a transportation device racking portion 600 may include a first securing portion 610 and a second securing portion 620. For instance, embodiments of the transportation device racking portion 600 may include a first securing portion 610 configured to secure a first portion of a transportation device 700, a second securing portion 620 configured to secure a second portion of the transportation device 700. Embodiments of the transportation device racking portion 600, in particular, the first securing portion 610 may be operably secured to a lower support unit 41, the lower support unit 41 configured to engage a vehicle element, such a receiver hitch of a RV. Securing may refer to any device which attaches, fixes, fastens, holds, or anchors in place.

Embodiments of the transportation device racking portion 600 may include a first securing portion 610. Embodiments of the first securing portion 610 of the transportation device racking portion 600 may have a first end 611, a second end 612, and a track element 640. The track element 640 may be a structural member configured to attach to the lower support frame 63, 60 having an opening extending through the length of the track element 640, wherein the lower support frame 63, 60 is attached to the lower support unit 41. Embodiments of the track element 640 may include at least two side walls 642, and a track 643. The track element 640 may be a track, guide, groove, channel, conduit, rail, and the like, configured to secure, hold, or fasten a first portion of the transportation device 700. For example, the track element 640 may accommodate, receive, support, engage, secure, etc., a tire or wheel of a bicycle; a tire of a bicycle or other transportation device 700 may rest upon the track 643, while the side walls 642 may act as a guide rail for the tire or wheel of the transportation device 700. Embodiments of the track element 640 may help support the weight of the transportation device 700 and prevent slippage or unwanted movement of the transportation device 700, especially when the rack 1000 is mounted to the RV during transit. For example, the track element 640 may include a lock or security device to further prevent movement, or theft during transportation, parking, idling, etc. Further, the track element 640 may include one or more straps to secure the wheel or a first portion of the transportation device 700 to the first securing portion 610. Moreover, the second end 612 of the first securing portion 610 may be structurally connected to the second end 622 of the second securing portion 620. In one embodiment, the second end 612 of the first securing portion 610 may be structurally integral with the second end 622 of the second securing portion 620. In another embodiment, the second end 612 of the first securing portion 610 may be connected via a fastening device(s) with the second end 622 of the second securing portion 620. In yet another embodiment, the first securing portion 610 may not be physically fastened to the second securing portion 620, wherein the first securing portion 610 is connected only to the lower support frame 63, and the second securing portion 620 is connected only to the lower support frame 63 and/or the upper support frame 1. Embodiments of the first securing portion 610 may extend a distance from the second securing portion 620; the distance the first securing portion 610 extends from the second securing portion 620, or length of the first securing portion 610, may vary according to the size of the transportation device 700 intended to be racked, and/or the size of the lower frame assembly 63, 60. Furthermore, embodiments of track element 640 may include a slot proximate or otherwise near the second end 612 end of the first securing portion 610. The slot may allow a cross-bar to slide back or forward to set the proper angle for the water craft nose angle; once the proper angle is obtained, the bolts through the slot may then be tightened. Embodiments of the first securing portion 610 may be comprised of metals, such as stainless steel, aluminum, and hard plastics, composite materials, or a combination thereof. Those having skill in the requisite art should appreciate that various materials may be used to form the rigid body of the first securing member 610. For instance, embodiments of the first securing portion 610 may be made of ⅛"-3/16" aluminum, or steel 1/16" thick, and the track element 640 may be 2" to 2½" wide in some embodiments.

Embodiments of the transportation device racking portion 600 may include a second securing portion 620. Embodiments of the second securing portion 620 of the transportation device racking portion 600 may include a first end 621, a second end 622, and a securing element 630 proximate the first end 621. Embodiments of the second securing portion 620 may be a vertical frame member 625, wherein the vertical frame member 625 may be adjustable in height. For instance, the vertical frame member 625 may be a rigid structural member that is configured to extend vertically and perpendicularly (or approximately perpendicularly) from the first securing portion 610 a distance. The distance the second securing portion 620, or the vertical frame member 625, extends (i.e. size of the vertical frame member 625) upward from the first securing portion 610, or the lower support frame 63 if the second securing portion 620 is not physically connected to the first securing portion 610, may vary depending on the size or length of the transportation device 700. The second securing portion 620 may extend at least a sufficient distance to allow for attachment to the upper support frame 1, as shown in FIG. 23. For instance, the second securing portion 620 may be operably connected to the upper support frame 1 through a welded connection, a bracket, or comparable fastening means and/or the second securing portion 620 may be operably connected to the lower support frame 63 through a welded connection, a bracket, or comparable fastening means Furthermore, a plurality of openings 629 may be located on the second securing portion 620 proximate or otherwise near the first end 621 of the second securing portion 620. The plurality of openings 629 may be openings, holes, bores, through-holes, and the like, configured to facilitate attachment of a securing element 630. The securing element 630 may be operably structurally connected to the second securing portion 620 proximate the first end 621 through cooperation with one or more of the plurality of openings 629. Because there is a plurality of openings 629 at different locations along the second securing portion 620, a user may place one or more securing elements 630 at various heights to accommodate various sizes of the transportation device 700. Alternatively, the frame members 625 may telescope to accommodate different sizes and heights. Embodiments of the securing element 630 may secure, hold, engage, grip, hook, lock, etc., a second portion of the transportation means 700 to prevent unwanted movement of the transportation device in a racked position. Embodiments of the securing element 630 may be a hook, clip, fastener, loop, clasp, or similar mechanical component that can removably enter one or more of the plurality of openings 629 at one end, and hook, secure, grip, etc. a portion of the transportation device 700. In one embodiment, the securing element 630 is a hook element or hooking portion that can cooperate with the opening 629 to prevent unwanted dislodgement of the securing element 630. For instance, the securing element 630 may include a bore that accepts a bolt once the securing element 630 is pushed into the opening 629 a certain distance. Moreover, embodiments of the securing element 630 may be a 5/16" bike hook with one end threaded to allow it to enter any one of the plurality of openings 629; this allows a person to hook one end and then easily roll the transportation device 700 into place and then strap the transportation device 700 into place while the securing element 630 holds the transportation device 700 into place. Those having skill in the art should appreciate that various means to lock the securing element 630 to the first end 621 of the second securing portion 620 may be implemented. Moreover, embodiments of the second securing portion 620 may be comprised of metals, such as stainless steel, aluminum, and hard plastics, composite materials, or a combination thereof. Those having skill in the requisite art should appreciate that various materials may be used to form the rigid body of the second securing member 620. For instance, embodiments of the second securing portion 620 may be made of ⅛"-3/16" aluminum, or steel 1/16" thick, and the track element 640 may be 2" to 2½" wide in some embodiments.

FIG. 24 depicts an embodiment of the multi-purpose rack 1000, wherein two separate transportation devices 700 are in a racked position. In the racked position, a first portion of the transportation device 700, such as a front or rear tire or wheel, may engage the track element 640 of the first securing portion 610. For instance, a front tire or wheel of a transportation device 100 may be placed between the side walls 642 and onto the track 643 of the track element 630 of the first securing portion 610. Furthermore, in the racked position, a second portion of the transportation device 700, such as a front tire or wheel, may be secured by the securing element 630 proximate the first end 621 of the second securing portion 620. For instance, a rear tire or wheel of a transportation device 700 may be hooked by the securing element 630 to prevent unwanted movement of the transportation device 700 during travel of the RV to which the rack 1000 is attached. In the racked position, the second portion of the transportation devices 700, or another portion thereof, may be surrounded by the upper support frame 1. As shown in FIG. 23, rack 1000 may include two transportation device racking portions 600.

FIGS. 25A and 25B depict an embodiment of the multipurpose rack 1000, wherein two separate transportation devices 700 and two separate watercraft 200 are in a racked position in a single racking device 1000. In most embodiments, the transportation devices 700 may be positioned between the watercraft 200. Moreover, the locking bar 4 may be open and closed to form an enclosure around the transportation devices 700 and the watercraft 200.

With reference to FIGS. 1-25B, a method of racking a watercraft 200 and a transportation device 700 may include the steps of providing a rack 1000 including a watercraft racking portion and a transportation device racking portion 600, and engaging a vehicle element with a lower support unit 41 of the rack 1000. The watercraft racking portion may be embodiments of rack 100, 101, 102, with the exception of the lower support unit 41. In other words, the watercraft racking portion may include some or all of the components described in association with rack 100, 101, 102, wherein the watercraft racking portion is operably connected to the lower support unit 41.

Various modifications and variations of the described apparatus and method will be apparent to those skilled in the art without departing from the scope and spirit of the invention. Although this invention has been described in connection with specific embodiments, outlined above, it should be understood that the invention should not be unduly limited to such specific embodiments. Various changes may be made without departing from the spirit and scope of the invention.

What is claimed is:

1. A multipurpose rack comprising:
   a first racking assembly for racking a first transportation device, the first racking assembly comprising:
      a first securing portion configured to secure a first portion of a first transportation device, the first securing portion having at least one track element for minimizing movement of the first transportation device; and
      a second securing portion operably connected to the first securing portion configured to releasably secure a second portion of the first transportation device;
   a second racking assembly for racking a second transportation device, the second racking assembly comprising:
      a first end portion having a clamping assembly for engaging a receiver of a vehicle, the first end portion accommodating a portion of the second transportation device, wherein the first end portion includes a lower support frame;
      a second end portion operably connected to the first end portion and spaced apart from the first end portion, the second end portion removably enclosing another portion of the second transportation; and
   wherein the first securing portion of the first racking assembly is operably connected to the lower support unit of the first end portion of the second racking assembly;
   wherein the first rack assembly and the second rack assembly form the multipurpose rack, the multipurpose rack being removably mounted to the vehicle only via the clamping assembly to vertically mount at least one of: the first transportation device, the second transportation device, and both the first transportation device and the second transportation device.

2. The multipurpose rack of claim 1, wherein the clamping assembly includes a lower support member removably connected with a standard receiver, a lower bracing unit, and a bottom end securing member.

3. The multipurpose rack of claim 1, wherein the second racking assembly includes a securing element having a hooking portion to resist unwanted movement of the first transportation device in a racked position.

4. The multipurpose rack of claim 1, wherein the first transportation means is a bicycle, and the second transportation device is a watercraft.

5. The multipurpose rack of claim 1, wherein the second securing portion of the first racking assembly is operably connected to an upper support frame of the first end portion of the second racking assembly.

6. The multipurpose rack of claim 1, wherein the lower support frame supports two cradles and two track elements.

7. A method of racking a watercraft and a transportation device comprising:
   vertically mounting a first transportation device and a second transportation device to a rear end of a recreational vehicle utilizing the multipurpose rack of claim 1.

8. A multi-purpose rack comprising:
   a lower support system configured to engage a motor vehicle, the lower support system including one or more brackets to secure and fasten a lower support member to a receiver of the motor vehicle, wherein one or more locking pins are used to further secure the lower support member in position with respect to the receiver by passing through one or more openings on the lower support member and one or more corresponding openings on the receiver;
   a lower support frame operably connected to the lower support unit, the lower support frame configured to accommodate a first portion of a first transportation device;
   an upper support frame having a locking bar that releasably secures another portion of the first transportation device;
   a track element operably connected to the lower support frame, the track element configured to accommodate a wheel of a second transportation device; and
   at least one vertical frame member operably connected to the upper support frame at a first end of the at least one vertical frame member, the at least one vertical frame member operably connected to the track element at a second end of the at least one vertical frame member, wherein a securing element located along the at least one vertical frame is configured to engage a second portion of the second transportation device;
   wherein an entire load of the multipurpose rack is supported by the connection between the lower support member and the receiver of the motor vehicle.

9. The multi-purpose rack of claim 8, wherein the lower support frame has at least one cradle positioned therein.

10. The multi-purpose rack of claim 9, wherein the wherein at least one cradle is attached to the lower support frame, the at least one cradle having a first wall with a first end and a second end, and a second wall with a first end and a second end, the second end of the first wall and the second end of the second wall are connected, and the first end of the first wall is attached to a first portion of the lower support frame and the first end of the second wall is attached to a second portion of the lower support frame, further wherein the first portion of the lower support frame is parallel to and spaced a distance away from the second portion of the lower support frame.

11. The multi-purpose rack of claim 8, wherein the securing element includes a hooking portion at one end, and cooperates with one of a plurality of openings on the vertical frame member to connect to the vertical frame member.

12. The multi-purpose rack of claim 8, wherein the track element includes at least two side walls and a track to prevent slippage of the wheel of the second transportation device.

13. The multi-purpose rack of claim 8, wherein the first transportation device is a watercraft.

14. The multi-purpose rack of claim 8, wherein the lower support frame supports two cradles and two track elements.

15. The multi-purpose rack of claim 8, wherein the upper support frame includes at least two side members that cooperate with the locking member to form an enclosure about the first transportation device and the second transportation device when in a vertical position on the multi-purpose rack.

* * * * *